United States Patent [19]
Mumey

[11] Patent Number: 4,624,071
[45] Date of Patent: Nov. 25, 1986

[54] HERBICIDE APPLICATOR

[76] Inventor: Glen A. Mumey, R. R. #3, Wetaskiwin, Alberta, Canada, T9A 1X1

[21] Appl. No.: 747,865

[22] Filed: Jun. 24, 1985

[51] Int. Cl.⁴ ............................................. A01G 13/00
[52] U.S. Cl. ................................................. 47/1.5
[58] Field of Search ................................. 47/1.5, 1.7

[56] References Cited

U.S. PATENT DOCUMENTS

| | | | |
|---|---|---|---|
| 1,527,669 | 2/1925 | Camp | 47/1.7 |
| 3,077,701 | 2/1963 | Osmun | 47/1.5 |
| 4,302,904 | 12/1981 | Mead | 47/1.5 |
| 4,359,188 | 11/1982 | Moore | 47/1.7 |
| 4,471,570 | 9/1984 | Chandler | 47/1.5 |

*Primary Examiner*—Robert A. Hafer
*Assistant Examiner*—Bradley M. Lewis
*Attorney, Agent, or Firm*—Ernest Peter Johnson

[57] ABSTRACT

A herbicide applicator, of the wiping type, comprises an elongate loop of flexible, solid wick material extending along and depending freely from a vertically adjustable frame member. The loop is suitably formed of polypropylene carpeting. Deployed within the loop is a conduit having spaced, upwardly directed spray nozzles. A tank and pump are connected with the conduit to supply pressurized herbicide liquid through the nozzles, whereby it is applied to the loop wall and spreads therealong. The loop has a broad lowermost end section for applying the herbicide to weeds and holding a quantity of fluid for coping with occasional dense weed patches. A pulsing switch operates the pump as required to vary the rate of delivery of liquid to the loop wall, whereby the quantum of applied liquid can be adjusted to the demand.

4 Claims, 3 Drawing Figures

U.S. Patent  Nov. 25, 1986  4,624,071
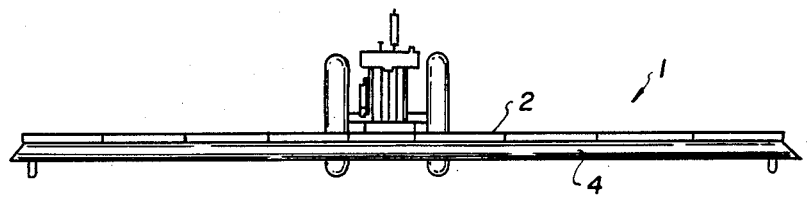
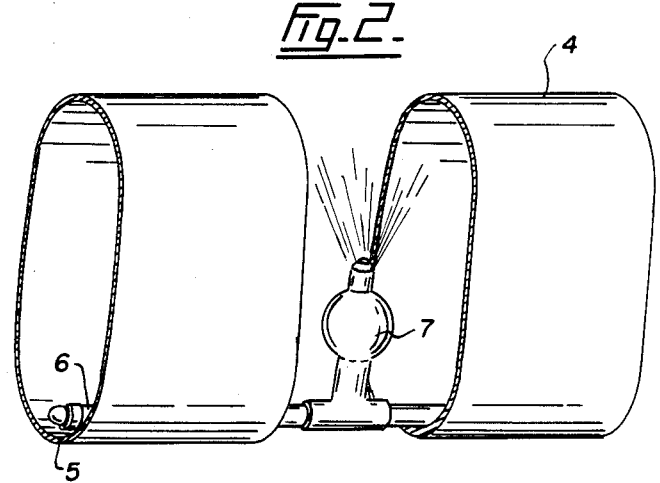
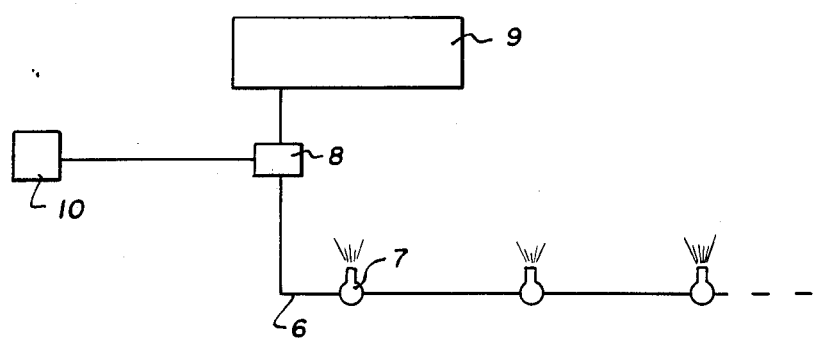

HERBICIDE APPLICATOR

FIELD OF THE INVENTION

The present invention relates to a herbicide applicator adapted to wipe liquid herbicide onto weeds which protrude above crop plants. More particularly it relates to that type of applicator which utilizes an absorbent material soaked with liquid herbicide; the applicator is mounted on a tractor or the like and suspended at a particular height as it passes along the ground, so that the absorbent material contacts only the weeds and transfers the herbicide thereonto.

BACKGROUND OF THE INVENTION

Wiping applicators are known in the art of applying herbicide to weeds. The applicators depend on utilization of the height differential that in many cases exists, for a period of time, between the targetted weeds and the crop plants. The concept inherent in these devices is to bring the absorbent material, suspended from a height-adjustable frame and soaked with herbicide, into contact only with the weeds.

Application of herbicide in this manner is characterized by minimal wastage of herbicide and little damage to the crop.

U.S. Patents which are of interest in connection with such applicators are: Nos. 4,208,835 (Roll et al); 4,223,478 (McHugh); 4,253,272 (Bertness); 4,274,589 (Jones); 4,285,160 (Barton); 4,302,904 (Mead); 4,320,595 (McClure); 4,377,920 (Bowman); and 4,446,650 (Davis).

In the first attempt to provide an applicator, applicant used a length of sewer pipe, which was closed at its ends to form a chamber containing a reservoir of liquid herbicide. A long, rectangular strip of carpet material was provided, having its upper longitudinal edge extending into the reservoir through a slot in the top of the pipe. The strip hung down like a curtain from the pipe. This embodiment provided a good "profile", in that the lower edge of the carpet strip was generally parallel to the ground. However, considerable difficulty was encountered in locating a material which would "wick" properly and bring the herbicide to the lower edge of the strip at a desirable rate. Also, when the assembly was moving along a hillside, the liquid would accumulate at the lower end of the pipe and would flood the carpet strip at that end, while the strip at the upper end would be starved for liquid. In addition, the assembly was only capable of supplying the herbicide to the strip lower edge at one rate, so there was no way of varying the amount of herbicide wiped on. Thus variations in weed density could not be accommodated or dealt with, except by varying the speed at which the applicator was moved along.

From the background work with this assembly, it became clear that an applicator should be characterized by the following desirable features:

good wicking capability;

the capability to vary the rate of herbicide supply to the surface contacting the weeds;

the capability to "store" herbicide at the contacting surface, to cope with temporary changes in demand, as when contacting a dense stand of weeds of limited extent;

the provision of a wiping element which could not be easily penetrated by brush and torn away and which presented a level profile;

the capability to uniformly supply herbicide along the length of the wiping element, When moving along an incline;

and rugged and simple construction.

SUMMARY OF THE INVENTION

The foregoing objectives were met by the provision of an applicator comprising an elongate, free-hanging loop of solid, flexible, absorbent wick material. Preferably, the loop consisted of a long, generally rectangular strip of carpet, capable of readily distributing liquid therealong and folded up so that its two longitudinal edges would be attached together to a vertically adjustable frame member from which the loop was suspended. The loop provided a broad wiping section at its lower end, which end section was capable of holding a quantity of herbicide for coping with unusually high temporary demands, such as would arise when the loop passed over an occasional dense stand of weeds.

Enclosed within the loop was an array of spray nozzles extending thq length of the loop and attached by conduit means to a pump and tank, for the supply thereto of pressurized herbicide liquid. Provision of the pressurized system ensured that the gravity effects, arising from travelling along a slope, could be overcome and uniform application of the herbicide maintained along the length of the loop. Incorporation of the pump further permitted control to be exercised over the rate at which the herbicide was supplied to the loop, whereby variations in demand for applied liquid could be accommodated.

The overall result of the combination was an applicator that provided a simple, damage-resistant, and effective wiping element that had a readily available quantum of reserve liquid at the wiping site, said applicator being adapted to evenly supply liquid to the wiping element on level ground or inclined slopes at variable rates, as required.

DESCRIPTION OF THE INVENTION

FIG. 1 is a schematic end view showing the applicator mounted behind a tractor;

FIG. 2 is a partially broken away perspective view showing a portion of the loop, with a spray nozzle mounted therein; and FIG. 3 is a schematic showing the pressure system for supplying the liquid herbicide to the loop.

DESCRIPTION OF THE PREFERRED EMBODIMENT

Referring now to the drawing, the applicator 1 comprises an elongate frame member 2 which is carried by a tractor or the like and is vertically adjustable in conventional manner.

Hanging freely from the frame member 2 and secured thereto by any suitable means is an elongate loop 4 of solid, flexible, absorbent wick material adapted to readily distribute liquid therealong. One suitable material for this purpose is polypropylene carpeting sold as indoor-outdoor carpeting by Ozite Canada 1981 Inc., Saint Jean, Quebec. This particular material was found to be exceptionally good at holding a desirable amount of the liquid in its broad lqwermost end section 5. In addition, the material, if sprayed at spaced intervals, readily distributes the liquid along its length. Typically, I use several 18"×120" strips aligned end to end and formed of this material. Each strip is doubled, with the dull side in, to form the desired envelope or loop. The material has sufficient stiffness so that it forms a wide loop 4 having a generally semi-circular bottommost portion 5. This bottommost portion 5 provides a broad arc of material adapted to hold a reservoir of herbicide. The loop further forms an internal cavity adapted to accommodate an internal spray assembly.

Deployed within the loop 4 along its length is a spary assembly comprising a conduit 6 having upwardly directed spray nozzles 7 at spaced points therealong. Typically, I use flexible hose having nozzles at 15" intervals. Suitable nozzles are available from Spraying Systems Inc., Wheaton, Ill., under catalog number 80067.

A pump 8 and connected tank 9 are carried by the tractor or frame member and connected with the conduit 6, for supplying herbicide liquid under pressure to the nozzles 7. Typically, I use a 12 volt pump capable of delivering 1 gpm at 40 psi.

An electronic pulsing switch 10 is operatively connected to the pump 8 to control its on-off times. A suitable switch for this purpose is available from Hayley Industrial Ltd., Calgary, Alberta. Typically the switch is set to turn the pump on for about 2 seconds. The operator will determine what off time, between about 10 and 180 seconds, is to be used.

The intermittent delivery of fluid, made possible by incorporation of the pulsing switch 10, allows relatively large orifices to be used in the spray nozzles 7, which reduces the danger of plugging.

The assembly is operated to soak the loop's bottommost portion 5 so that it is on the verge of dripping or is dripping slightly. In this condition, it applies a suitable dosage to the weeds and retains an emergency supply or reservoir to assist in coping with occasional dense patches of weeds. The rate of liquid supply can be varied to cope with changes in demand, of greater extent thatn that of the occasional dense patch, by adjusting the pulsing switch 10. The flexible, solid loop 4 has been found to be free of the breaking and tearing away problems associated with earlier prototypes. And the pressurized system operates to substantially uniformly apply the liquid to the loop along its length when the unit is moving along an incline.

The scope of the invention is defined by the claims now following.

The embodiments of the invention in which an exclusive property or privilege is claimed as defined as follows:

1. A herbicide applicator for applying liquid herbicide to weeds, comprising:

an elongate frame member supportable for movement in spaced parallel relationship to the ground surface;

an elongate loop of solid, flexible, absorbent material, mounted to depend freely from the frame member whereby it may brush against the weeds as the frame member moves along, said loop having sufficient stiffness and depending from the frame so as to provide a bottommost portion which is substantially semi-circular in configuration, to provide a broad arc of material adapted to hold a reservoir of herbicide for application, said loop forming a cavity adapted to accommodate an internal spray assembly;

elongated means, deployed within the loop along its length and being supported by said bottommost portion of said loop said loop, for spraying, under pressure, herbicide into the loop cavity to wet the absorbent material; and means for supplying the herbicide to the spraying means under pressure at a controlled rate selected to maintain the absorbent material of the bottommost portion of the loop at a predetermined moisture content.

2. The herbicide applicator as set forth in claim 1 wherein:

the spraying means comprises a plurality of spaced apart nozzles positioned to spray upwardly, and conduit means, communicating with said nozzles, for supplying the liquid herbicide under pressure to said nozzles.

3. The herbicide applicatqr as set forth in claim 2 wherein:

said supplying means comprises means for pumping the liquid under pressure into the conduit means, and means for controlling the pumping means whereby the latter supplies the liquid herbicide in a pulsed manner.

4. The herbicide applicator as set forth in claim 3 wherein:

the loop is formed of polypropylene carpet material.

* * * * *